US011313274B2

(12) United States Patent
Mokheimer et al.

(10) Patent No.: US 11,313,274 B2
(45) Date of Patent: Apr. 26, 2022

(54) INTEGRATED POWER GENERATION SYSTEM

(71) Applicant: KING FAHD UNIVERSITY OF PETROLEUM AND MINERALS, Dhahran (SA)

(72) Inventors: Esmail M. A. Mokheimer, Dhahran (SA); Mohamed A. Habib, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 128 days.

(21) Appl. No.: 16/597,518

(22) Filed: Oct. 9, 2019

(65) Prior Publication Data

US 2021/0108564 A1 Apr. 15, 2021

(51) Int. Cl.
| | |
|---|---|
| *F02C 1/05* | (2006.01) |
| *F01K 25/00* | (2006.01) |
| *F02C 3/22* | (2006.01) |
| *F03G 6/04* | (2006.01) |
| *F02C 7/22* | (2006.01) |

(52) U.S. Cl.
CPC .............. *F02C 1/05* (2013.01); *F01K 25/005* (2013.01); *F03G 6/04* (2013.01); *B01J 2219/00144* (2013.01); *B01J 2219/24* (2013.01); *F02C 3/22* (2013.01); *F02C 7/22* (2013.01)

(58) Field of Classification Search
CPC .......... F01K 25/005; F03G 6/04; F03G 6/064; B01J 2219/24; B01J 2219/00144
See application file for complete search history.

(56) References Cited

U.S. PATENT DOCUMENTS

| | | | |
|---|---|---|---|
| 6,510,695 B1 | 1/2003 | Fisher | |
| 8,674,532 B2 | 3/2014 | Wei et al. | |
| 8,893,505 B2 * | 11/2014 | Mokheimer | F02C 7/08 60/780 |
| 9,664,115 B2 * | 5/2017 | Nemitallah | B01J 19/2445 |
| 10,189,709 B2 | 1/2019 | Mokheimer et al. | |
| 2016/0340187 A1 | 11/2016 | Said et al. | |
| 2019/0135627 A1 | 5/2019 | Mokheimer et al. | |

OTHER PUBLICATIONS

M.D. Dolan, et al., "An experimental and techno-economic assessment of solar reforming for $H_2$ production", International Journal of Hydrogen Energy, vol. 41, Issue 33, Sep. 7, 2016, pp. 14583-14595 (Abstract only).

(Continued)

*Primary Examiner* — Alain Chau
*Assistant Examiner* — Sean V Meiller
(74) *Attorney, Agent, or Firm* — Oblon, McClelland, Maier & Neustadt, L.L.P.

(57) ABSTRACT

A power generation system using a combined solar-assisted fuel reformer and oxy-combustion membrane reactor is proposed. The system uses solar heating to activate the endothermic fuel steam reforming reaction. The produced gas is separated into streams of $H_2$ and CO for separate oxy-combustion reactions. The $O_2$ used in the oxy-combustion reactions is produced by permeating $O_2$ through ion transport membranes in contact with solar-heated air.

20 Claims, 6 Drawing Sheets

(56) References Cited

OTHER PUBLICATIONS

Mohamed A. Habib, et al., "Numerical investigation of syngas oxy-combustion inside a LSCF-6428 oxygen transport membrane reactor", ENERGY, vol. 96, Feb. 1, 2016, pp. 654-665 (Abstract only).

Yinka S. Sanusi, et al., "Thermo-economic optimization of hydrogen production in a membrane-SMR integrated to ITM-oxy-combustion plant using genetic algorithm", Applied Energy, vol. 235, 2019, pp. 164-176.

Yinka S. Sanusi, et al., "Thermo-economic analysis of integrated membrane-SMR ITM-oxy-combustion hydrogen and power production plant", Applied Energy, vol. 204, 2017, pp. 626-640

\* cited by examiner

INTEGRATED POWER GENERATION SYSTEM

BACKGROUND OF THE INVENTION

Technical Field

The present invention relates to solar-heated liquid fuel reformer having an integrated power generation system.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In the present century, global warming is a great world challenge. Carbon dioxide ($CO_2$) is the main greenhouse gas contributor to global warming. Atmospheric $CO_2$ concentration is continuously increasing and causing the average global temperature to rise. A significant source of $CO_2$ emissions in the coming decades is from fossil-fuel generated power. This increased rate of $CO_2$ emissions and corresponding global temperature rise has encouraged the development of technologies designed to reduce $CO_2$ emissions resulting from large power plants. Such technologies include carbon capture and storage (CCS), nuclear power and renewable energies such as wind, biomass, and solar, in addition to improving the efficiencies of energy conversion.

Carbon capture and sequestration technology may be the fastest method of quickly reducing carbon emissions to the atmosphere from fossil fuel generated power. There are different available carbon capture technologies which can be applied in the utility industry and include post-combustion carbon capture technology, oxy-combustion carbon capture technology, and pre-combustion carbon capture technology.

The oxy-combustion process is the most promising carbon capture technology and involves burning fuel using pure oxygen instead of air as the primary oxidant. The aim of an oxy-combustion process is to improve the combustion process, reduce the amount of $NO_x$ emissions, and capture the resultant $CO_2$ at the exit section. Using syngas as a fuel results in a reduction in the $CO_2$ concentration at the exhaust section due to the reduction in the number of carbon atoms in fuel and improved combustion due to the presence of hydrogen. The oxygen enriched combustion with air or pure oxygen combustion enhances the fuel combustion process due to the associated reduction of $N_2$ with the oxidizing air. Nitrogen has serious effects on the combustion process as it is an energy carrier medium and it mixes with the combustion gases so that it reduces the concentration of the oxidizing oxygen. In addition, because nitrogen has a high capacity to absorb heat, it absorbs energy and as a result the combustion efficiency is reduced. In oxy-combustion techniques, fossil fuel is burned in the presence of pure oxygen (without nitrogen) with carbon dioxide (or exhaust gas, $CO_2$, and water vapor) as diluent or sweep gas. Therefore, the exhaust of an oxy-combustion contains only carbon dioxide ($CO_2$) and water vapor. Oxy-combustion is a promising technique because the produced carbon dioxide can further be captured by condensing water vapor in the exhaust. In addition, the condensed water vapor can be treated to produce distilled water or fresh water for drinking and industrial applications.

It is also possible for an integrated oxy-combustion system to produce syngas by steam reforming natural gas. Syngas, or synthesis gas, is a fuel gas mixture consisting primarily of hydrogen, carbon monoxide, and very often some carbon dioxide. Here, the hydrogen present in the syngas is further separated by pressure swing adsorption (PSA) techniques or hydrogen ($H_2$) selective membranes to produce streams of pure hydrogen and hydrogen depleted syngas (i.e. CO enriched). The steam reforming reaction of natural gas is endothermic and requires a high influx of heat energy to the reactor. A large amount of energy is needed for generating steam that supplies steam reforming reactors. Typically, this energy would be generated from fossil fuel resources that result in a large emission of greenhouse gas, particularly $CO_2$. Therefore, plant designers have considered and applied different ways of carbon capture and carbon reduction in recent steam reforming plant designs.

In view of the forgoing, one objective of the present invention is to provide a combination between both syngas production technology and oxy-fuel combustion technology inside ion transport membrane (ITM) reactors within a power generation system. A membrane reformer assembly is used to form syngas and to separate hydrogen from the syngas for separate oxy-fuel combustion reactions. In the power generation system, the required energy for steam reforming reactions, hydrogen separation processes, steam generating processes, and oxygen separation processes are obtained by solar-heated air or by burning hydrogen-depleted syngas resulting from separation of hydrogen from syngas. Another objective of the present invention relates to a process for generating power using the power generation system.

BRIEF SUMMARY OF THE INVENTION

According to a first aspect, the present disclosure relates to a system for generation of electricity. The system comprises a solar-heated air system producing a first hot air for heating of a fuel reformer, which reacts a fuel and a first steam to produce $H_2$ and CO. The solar-heated air system produces a second hot air for separation of $O_2$.

The system also includes a hydrogen combustion system that is fed $H_2$ separated from the fuel reformer by a hydrogen separation membrane. The hydrogen combustion system is also fed $O_2$ separated from the second hot air by a first ion transport membrane. The hydrogen combustion system produces a second steam, which powers a first gas turbine, and is used as a first steam source for the fuel reformer. The first gas turbine is connected to a first electric generator.

The system also includes a carbon monoxide combustion system fed CO from the fuel reformer and fed $O_2$ separated from the hot air by a second ion transport membrane. The carbon monoxide combustion system produces $CO_2$ that powers a second gas turbine that is connected to a second electric generator.

In one embodiment, the hydrogen separation membrane comprises vanadium, palladium, or both.

In one embodiment, the fuel is fed into the system as a liquid fuel.

In one embodiment, the system further comprises an air intake compressor which produces an air flow for the solar-heated air system.

In a further embodiment, the air intake compressor is mechanically connected to and powered by the first gas turbine.

In one embodiment, a first portion of $CO_2$ produced by the carbon monoxide combustion system is fed as a sweep gas in the hydrogen combustion system.

In one embodiment, a second portion of $CO_2$ produced by the carbon monoxide combustion system is fed to a fuel atomizer where the fuel is atomized by the second $CO_2$ prior to entering the fuel reformer.

In a further embodiment, the second portion of $CO_2$ is compressed before entering the fuel atomizer.

In one embodiment, the system further comprises a second steam source for the fuel reformer, the second steam source produced by heating a first water by a third hot air.

In one embodiment, the system further comprises a third gas turbine powered by an $O_2$-depleted air. The $O_2$-depleted air is produced by the separation of $O_2$ from the second hot air contacting the first and/or second ion transport membranes, and the third gas turbine is connected to a third electric generator.

In a further embodiment, the $O_2$-depleted air is used to heat a second water to form the first steam source, wherein the second water is condensed from the second steam.

In a further embodiment, the system also has a compressor mechanically coupled and powered by the third gas turbine. The compressor compresses a $CO_2$ produced by the carbon monoxide combustion system to produce a first portion of $CO_2$ that is fed as a sweep gas in the hydrogen combustion system.

In one embodiment, all generated $CO_2$ is self-contained in the system.

In one embodiment, atomized fuel and the fuel reformer are heated simultaneously by a same volume of first hot air.

In one embodiment, the hydrogen separation membrane is in direct contact with the fuel reformer and the hydrogen combustion system.

In one embodiment, the first ion transport membrane is in direct contact with the hydrogen combustion system and a hot air separation chamber.

In one embodiment, the second ion transport membrane is in direct contact with the hot air separation chamber and the CO combustion system.

According to a second aspect, the present disclosure relates to a method for generating electricity using the system of the first aspect. This involves exposing the solar-heated air system to sunlight to produce the first and second hot air, where the first hot air heats the fuel reformer. A vaporized fuel and the first steam are fed into the fuel reformer, producing separate streams of CO and $H_2$ by the hydrogen separation membrane. A second hot air is fed to the first and second ion transport membranes to produce a first and a second stream of $O_2$. The $H_2$ stream is combusted with the first stream of $O_2$ to generate electricity in the first electric generator. The CO stream is combusted with the second stream of $O_2$ to generate electricity in the second electric generator.

In one embodiment, the method further comprises producing a stream of $O_2$-depleted air from the second hot air, and feeding the stream of $O_2$-depleted air to generate electricity in a third electric generator.

In one embodiment, the method further comprises feeding a $CO_2$ into the hydrogen combustion system. The $CO_2$ is produced by combusting the CO stream.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
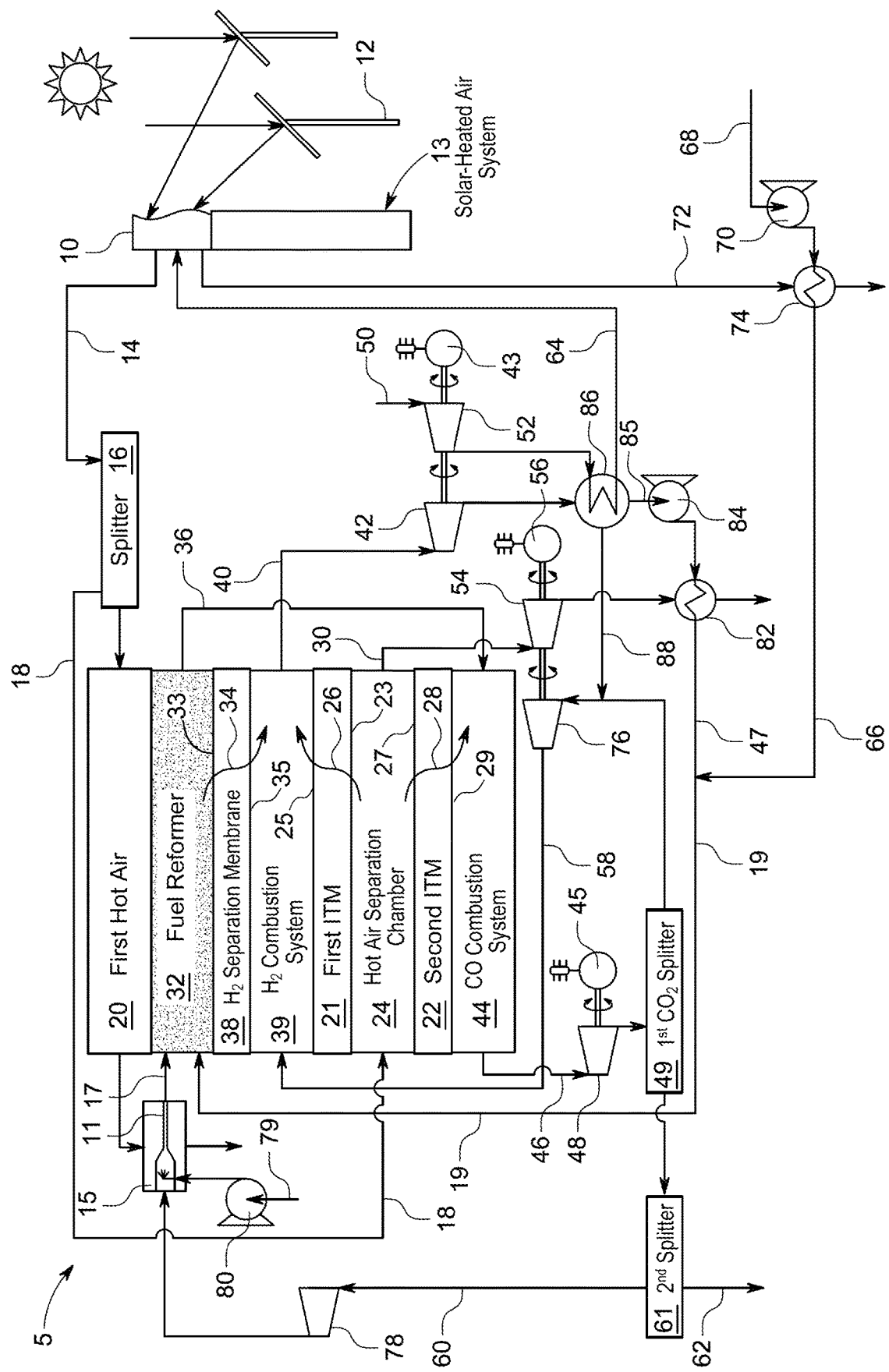
FIG. 1 shows an embodiment of the system described in the present disclosure.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values),+/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

As used herein, the term "substantially planar" refers to a generally flat, generally two dimensional surface that has a standard deviation in height across the surface (the deviation in height produced by irregular protrusions above or depressions below an average height) that is less than 3 mm, preferably less than 2 mm, preferably less than 1 mm, preferably less than 500 µm.

The present disclosure is intended to include all hydration states of a given compound or formula, unless otherwise noted or when heating a material. For example, $Ni(NO_3)_2$ includes anhydrous $Ni(NO_3)_2$, $Ni(NO_3)_2 \cdot 6H_2O$, and any other hydrated forms or mixtures. $CuCl_2$ includes both anhydrous $CuCl_2$ and $CuCl_2 \cdot 2H_2O$.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

According to a first aspect, the present disclosure relates to a system for generation of electricity. The system 5 comprises a solar-heated air system 13 producing a first hot air 20 for heating of a fuel reformer 32, which reacts a fuel 17 and a first steam 19 to produce $H_2$ 34 and CO 36. The solar-heated air system also produces a second hot air 18 for separation of $O_2$ from the second hot air and a third hot air 72 for producing a second steam source 66.

Figure 2:
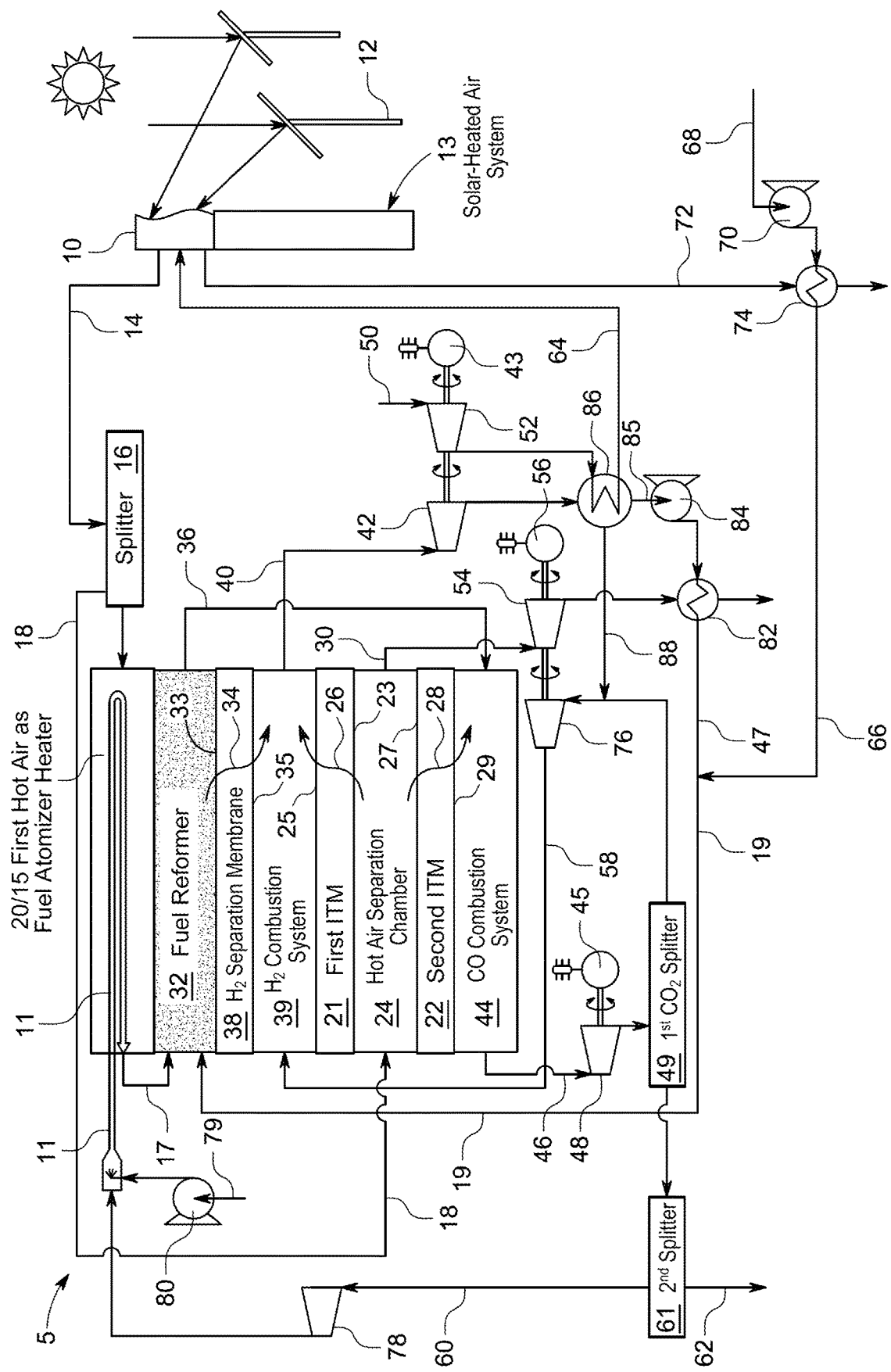
FIG. 2 shows another embodiment of the system described in the present disclosure.

The solar-heated air system 13 may comprise one or more reflectors 12 that directs sunlight towards a solar collector 10. The solar heated air system 13 may comprise a solar collector 10 that may be disposed on a tower among a field of solar reflectors 12, such as mirrors or heliostats. The solar reflectors 12 may be arranged proximate the tower for directing solar energy or solar radiation from the sun to the solar collector 10. The solar reflectors 12 may have a curved or flat configuration. Each solar reflector 12 may be independently adjustable in response to the relative position of the sun. For example, the solar reflectors 12 may be arranged in arrays, whereby the solar reflector of each array is controlled separately or in combination with the other solar reflectors 12 of the array by one or more control devices (not shown) configured to detect and track the relative position of the sun. Thus, such solar reflectors 12 can adjust according to the position of the sun to reflect sunlight onto the solar collector 10, thereby warming the working fluid, e.g., air, in the solar collector. While a tower-based solar-heated air system 13 is shown in FIGS. 1 and 2, in other embodiments, a solar collector 10 may be disposed in a trough, similar to trough-based solar receiver designs known in the art.

The solar reflectors 12 direct the solar radiation of the sun onto the solar collector 10. In further embodiments, the solar radiation is directed onto a panel of tubes or a single tube having air flowing therethrough. The radiant heat increases the temperature of the air flowing therethrough to generate the hot air 14.

The solar collector 10 may be similar to one or more of the following types of solar collector arrangements. These types based on whether the solar energy is concentrated into a line-focus receiver or a point-focus receiver and whether the solar reflectors 12 are single monolithic reflectors, or multiple reflectors arranged as a Fresnel reflector to approximate a monolithic reflector.

A line-focus receiver is a solar collector with a target that is a relatively long straight line, like a pipe. A line-focus concentrator is a reflector that receives sunlight over a two dimensional space and concentrates the sunlight into a significantly smaller focal point in one dimension (width) while reflecting the sunlight without concentration in the other dimension (length) thus creating a focal line. A line-focus concentrator with a line-focus receiver at its focal line is a basic trough system. The concentrator is optionally rotated in one dimension around its focal line to track daily movement of the sun to improve total energy capture and conversion.

A point-focus receiver is a receiver target that is essentially a point, but in various approaches is a panel, window, spot, ball, or other target shape, generally more equal in width and length than a line-focus receiver. A point-focus concentrator is a reflector (made up of a single smooth reflective surface, multiple fixed facets, or multiple movable Fresnel facets) that receives sunlight over a two-dimensional space and concentrates the sunlight into a significantly smaller focal point in two dimensions (width and length). A monolithic point-focus concentrator with a point-focus receiver at its focal point is a basic dish concentrated solar system. The monolithic concentrator is optionally rotated in two dimensions to rotate its focal axis around its focal point to track daily and seasonal movement of the sun to improve total energy capture and conversion.

A parabolic trough system is a line concentrating system using a monolithic reflector shaped like a large half pipe. The reflector has a 1-dimensional curvature to focus sunlight onto a line-focus receiver or approximates such curvature through multiple facets fixed relative to each other.

A concentrating Fresnel reflector is a line concentrating system similar to the parabolic trough replacing the trough with a series of mirrors, each the length of a receiver, that are flat or alternatively slightly curved in their width. Each mirror is individually rotated about its long axis to aim incident sunlight onto the line-focus receiver.

A parabolic dish system is a point concentrating system using a monolithic reflector shaped like a bowl. The reflector has a 2-dimensional curvature to focus sunlight onto a point-focus receiver or approximates such curvature through multiple flat or alternatively curved facets fixed relative to each other.

In other embodiments, the solar collector 10 may allow concentrated sunlight to heat air indirectly, such as allowing sunlight to directly heat a circulating molten salt (for instance, potassium nitrate, sodium nitrate, and mixtures thereof) which is then used to heat a flow of air. Or, circulating steam may be used to indirectly heat the flow of air. In alternative embodiments, rather than a solar-heated air system, air may be heated by a combustion reaction, geothermal heat, a nuclear reaction, or an electric heating element. In one embodiment, the hot air 14 may exit the solar collector 10 with a temperature in a range of 600-1,500° C., preferably 700-1,400° C., more preferably 800-1,300° C., more preferably 850-1,100° C. Molten salt used to heat air indirectly may be heated to a temperature of 700-2,000° C., preferably 800-1,500° C., more preferably 900-1,400° C., more preferably 950-1,300° C.

The hot air 14 initially produced by the solar-heated air system may be diverted at a splitter 16 to produce the first hot air 20 and a second hot air 18 for contacting with the first and second ion transport membranes (ITM) 21/22.

In one embodiment, the fuel reformer 32 and/or the first and second ion transport membranes 21/22 may be heated entirely by solar-heated air. In other embodiments, the fuel reformer 32 and/or the first and second ion transport membranes 21/22 may be heated partly by solar-heated air (for instance, if the solar heated air has a temperature of 300-400° C.) and partly heated by other means (such as a combustion reaction, geothermal heat, a nuclear reaction, or an electric heating element). In an alternative embodiment, the fuel reformer 32 and/or the first and second ion transport membranes 21/22 are not heated by solar-heated air.

The first hot air 20 may flow in an opposite direction as the reactant gases in the fuel reformer 32, or may flow in the same direction. The first hot air 20 may additionally contact atomized liquid fuel 11 in order to produce a vaporized liquid fuel 17. In one embodiment, as shown in FIG. 1, the first hot air 20 provides heat to the fuel reformer 32 and then the first hot air heats the atomized liquid fuel 11 within a vessel 15. However, FIG. 2 illustrates another embodiment, where the atomized fuel 11 and the fuel reformer 32 are heated simultaneously by the same volume of first hot air 15/20. In one embodiment, the first hot air 20 is separated from the fuel reformer 32 by an impermeable divider that allows heat transfer but prevents the first hot air 20 from permeating the fuel reformer 32.

The fuel reformer 32 is fed a vaporized fuel 17 which may originate as a liquid fuel 79, which is pumped by a pump 80 into the atomizer 15 to produce an atomized liquid fuel (for instance, liquid fuel in the form of aerosol droplets), which is heated to produce a vaporized fuel 17. However, in other embodiments, the fuel may enter as a gas, such as methane gas, without having to be pumped as a liquid, atomized, and vaporized. In other embodiments, a fuel that is gaseous at standard temperature and pressure may enter the system as a liquid under pressure. In one embodiment, the fuel is methane or natural gas. In one embodiment, the liquid fuel may be liquefied petroleum gas (LPG), naphtha, or a similar liquid fuel.

The natural gas stream may preferably be a methane stream, i.e. having at least 85 vol %, preferably at least 90 vol %, preferably at least 95 vol %, preferably at least 98 vol % of methane, that contains less than 10.0 vol %, preferably less than 5.0 vol %, preferably less than 2.0 vol % of ethane, and other hydrocarbon compounds (e.g. alkanes, alkenes, alkynes, cycloalkanes, etc.) having a carbon content in the range of $C_2$-$C_{20}$, preferably $C_2$-$C_{12}$, more preferably $C_3$-$C_8$. The natural gas stream may also contain less than 5.0 vol %, preferably less than 2.0 vol % of oxygen, nitrogen, and water vapor. The natural gas stream may further include less than 500 ppm, preferably less than 100 ppm, and more preferably less than 50 ppm of sulfur. Further to the above, the natural gas stream may include trace amounts (preferably less than 0.1 vol %) of hydrogen sulfide, argon, helium, nitrogen oxides (i.e. nitric oxide, nitrous oxide, nitrogen dioxide), or sulfur dioxide. Each volume percentile is relative to the total volume of the natural gas stream. A pressure of the natural gas stream may be adjusted by the compressor to be in the range of 2 to 20 bars, preferably 10 to 18 bars, preferably 12 to 16 bars, preferably about 15 bars, whereas a temperature of the natural gas stream may be adjusted to be within the range of 500-1,000° C., preferably 600-900° C. The natural gas stream is in a gaseous phase before entering the gas mixer. In another embodiment, a portion of the natural gas stream is delivered to one of the combustor inlets, i.e. the fuel inlet, to combust with the hydrogen-depleted syngas stream in the presence of the oxidant in the combustor.

The fuel reformer 32 is also fed a first steam 19 which also provides heat to activate the fuel reformer and is also a reactant in the fuel reforming reaction to produce hydrogen gas 34 and carbon monoxide 36. Hydrogen gas and carbon monoxide together are also known as "syngas," and the fuel reforming reaction may be known as "steam reforming of methane." The fuel reforming reaction may be endothermic, and thus, higher reaction efficiency may be obtained by heating the fuel reformer 32.

The fuel reformer 32 comprises a catalyst that is well known to the skilled in the art. In one embodiment, the catalyst is a nickel-doped aluminum oxide having 15 to 30 wt %, preferably 20 to 28 wt % of nickel, relative to the total weight of the catalyst. The catalyst may be a fixed bed catalyst and may be on a ceramic support. The steam reforming reaction of natural gas and steam to form syngas is: $CH_{4(g)} + H_2O_{(g)} \rightarrow CO_{(g)} + 3H_{2(g)}$. The fuel reformer may have a temperature in the range of 600 to 1,100° C., preferably 700 to 1,000° C., preferably 800 to 900° C. and gases in the fuel reformer 32 may have pressures in a range of 1-50 bars, preferably 5-30 bars, more preferably 10-20 bars.

The syngas stream, i.e. the stream that is formed in the fuel reformer 32 right before any separation of gas products, may preferably contain at least 90 vol %, preferably at least 95 vol %, preferably at least 98 vol % of carbon monoxide and hydrogen, wherein a molar ratio of hydrogen to carbon monoxide in the syngas stream is in the range of 10:1 to 1:2, preferably 8:1 to 1:1.5, preferably 5:1 to 1:1, preferably about 3:1. Furthermore, the syngas stream may contain less than 5 vol %, preferably less than 2 vol %, preferably less than 1 vol % of methane, ethane, water vapor, etc. Each volume percentile is relative to the total volume of the syngas stream produced.

In one embodiment, the system also includes a hydrogen combustion system 39 that is fed $H_2$ 34 separated from the fuel reformer by a hydrogen separation membrane 38. The hydrogen combustion system may also be called an $H_2$ oxy transport reactor (OTR).

The hydrogen separation membrane 38 is used in the system to separate hydrogen from a hydrogen-enriched stream, e.g. the syngas, by transporting molecular hydrogen through the hydrogen separation membrane 38 at elevated temperatures, e.g. a temperature in the range of 300 to 900° C., preferably 500 to 800° C. Thus, the hydrogen separation membrane 38 may also be considered a hydrogen-permeable membrane. When a hydrogen-enriched stream, e.g. syngas, is applied on one side 33 of a hydrogen-permeable membrane under pressure, hydrogen molecules transport through the membrane and emerge on an opposite side 35 of the membrane. Accordingly, the hydrogen separation membrane 38 may only allow passage of hydrogen molecules from the fuel reformer 32 to the hydrogen combustion system 39.

The hydrogen separation membrane 38 may also be called a hydrogen-permeable membrane and may be a substantially flat membrane or an elongated tube having a diameter in the range of 5 to 500 mm, preferably 10 to 100 mm, more preferably 15 to 50 mm. Furthermore, the hydrogen separation membrane 38 may have a length similar to the length of the fuel reformer 32. A wall thickness of the hydrogen separation membrane may be in the range of 1 μm to 10 mm, preferably 20 μm to 1 mm, preferably 40 to 500 μm, preferably 50 to 200 μm, preferably 60 to 100 μm. Additionally, a surface area of the hydrogen separation membrane may be in the range of 0.05-5 $m^2$, preferably 0.1-4 $m^2$, more preferably 0.5-3 m², even more preferably 1-2 m². Accordingly, a hydrogen flux of the hydrogen separation membrane may be within the range of 0.01-0.2 mol·m$^{-2}$·s$^{-1}$, preferably 0.05-0.15 mol·m$^{-2}$·s$^{-1}$, more preferably 0.08-0.12 mol·m$^{-2}$·s$^{-1}$, at a temperature in the range of 800-2,000° C., more preferably 1,000-1,800° C., even more preferably 1,200-1,500° C.

In one embodiment, the hydrogen separation membrane 38 comprises vanadium or palladium, for instance, as alloys. In one embodiment, the hydrogen separation membrane comprises 1-90 wt %, preferably 10-85 wt %, more preferably 30-80 wt %, even more preferably 35-75 wt % vanadium. In one embodiment, the hydrogen separation membrane comprises 1-90 wt %, preferably 10-85 wt %, more preferably 30-80 wt %, even more preferably 35-75 wt % palladium. Alternatively, in another embodiment, the hydrogen separation membrane is a palladium-silver alloy membrane, or a vanadium-silver alloy membrane, wherein an amount of silver in the hydrogen separation membrane is in the range of 15 wt % to 30 wt %, preferably 20 wt % to 28 wt %, preferably about 25 wt %, relative to the total weight of the hydrogen separation membrane. In addition, one or more transition metals may also be incorporated in the composition of the hydrogen separation membrane. Said transition metals may preferably be selected from the group consisting of yttrium, indium, copper, and ruthenium. In one embodiment, the hydrogen separation membrane comprises both vanadium and palladium, where a mass ratio of vanadium to palladium may be in a range of 1:100-100:1, preferably 1:10-10:1, more preferably 1:3-3:1.

In one embodiment, a hydrogen separation capacity of the hydrogen separation membrane 38 is in the range of 0.1 to 10 m³/h (cubic meter per hour), preferably 0.5 to 9.0 m³/h, preferably 1.0 to 8.0 m³/h, preferably 1.5 to 7.5 m³/h, preferably 2.0 to 7.0 m³/h, preferably 2.5 to 6.0 m³/h.

In one embodiment, a selectivity of the hydrogen separation membrane 38 with respect to molecular hydrogen is at least 90 wt %, preferably at least 95 wt %, more preferably at least 98 wt %, relative to the total weight of the substances that are adsorbed and transported by the membrane. Selectivity of a hydrogen separation membrane 38 with respect to a particular substance is a measure of the capability of that hydrogen separation membrane to adsorb and transport that substance over other substances present. For example, if selectivity of a hydrogen separation membrane with respect to molecular hydrogen is 99 wt %, then 99 wt % of the total substances that are transported by the membrane are hydrogen molecules. Similarly, a hydrogen separation membrane having 100 wt % selectivity with respect to molecular hydrogen only allows hydrogen molecules to permeate through the membrane. In another embodiment, a selectivity of the hydrogen separation membrane with respect to carbon monoxide, methane, nitrogen (i.e. $N_2$), water vapor, carbon monoxide, argon, and sulfur is less than 1 wt %, preferably less than 0.5 wt %, more preferably less than 0.1 wt %.

The hydrogen combustion system 39 is also fed $O_2$ separated from the second hot air 18 by a first ion transport membrane (ITM) 21. The hydrogen combustion system produces a second steam 40 by combusting $H_2$ with $O_2$, which combustion reaction powers a first gas turbine 42, and is used as a first steam source 47 for the fuel reformer 32. The first gas turbine 42 is connected to a first electric generator 43. The hydrogen combustion system 39 may also be fed a first portion of $CO_2$ as a sweep gas 58 which may be used to control the amount of combustion. This first portion of $CO_2$ 58 is a part of the total $CO_2$ 46 produced by the CO combustion system 44. The hydrogen combustion system may further include an ignition source, such as a sparkplug.

In some embodiments, the hydrogen combustion system 39 includes an oxygen inlet, a hydrogen inlet, a sweep gas inlet, and an exhaust outlet. Preferably, the oxygen inlet, the hydrogen inlet, the sweep gas inlet, and the exhaust outlet are substantially similar, wherein each is a tubular channel that is configured to deliver a gaseous stream to the combustor or from the combustor. Preferably, the oxygen inlet, the hydrogen inlet, the sweep gas inlet, and the exhaust outlet are made of a metal, a metal alloy, a ceramic composite, or a metal alloy coated with a high-temperature duty ceramic (e.g. alumina). Preferably, the oxygen inlet, the hydrogen inlet, the sweep gas inlet, and the exhaust outlet may bear a pressure of up to 50 bars, preferably up to 100 bars, even more preferably up to 150 bars, while may also resist a temperature up to 1,000° C., preferably 1,500° C., more preferably 2,000° C.

In one embodiment, the first ion transport membrane is substantially planar. In some embodiments, the first ion transport membrane 21 is an elongated tube having a diameter in the range of 5 to 500 mm, preferably 10 to 100 mm, more preferably 15 to 50 mm. Furthermore, the elongated tube preferably has a length in the range of 0.5 to 5 m, more preferably 1 to 4 m, even more preferably 1.5 to 3 m. A wall thickness of the elongated tube may be in the range of 0.5 to 3.5 mm, preferably 0.5 to 2 mm, more preferably 1 to 1.5 mm. Additionally, a surface area of the first ion transport membrane 21 may be in the range of 0.05-5 m², preferably 0.1-4 m², more preferably 0.5-3 m², even more preferably 1-2 m². Accordingly, an oxygen flux of the first ion transport membrane 21 may be within the range of 0.01-0.2 mol·m$^{-2}$·s$^{-1}$, preferably 0.05-0.15 mol·m$^{-2}$·s$^{-1}$, more preferably 0.08-0.12 mol·m$^{-2}$·s$^{-1}$, at a temperature in the range of 800-2,000° C., more preferably 1,000-1,800° C., even more preferably 1,200-1,500° C.

In a preferred embodiment, the first ion transport membrane 21 has a compressive strength of at least 50 MPa, preferably at least 100 MPa, more preferably at least 200 MPa, to sustain an excessive pressure on the feed side 23. The first ion transport membrane 21 may preferably be secured inside an assembly with bolts and nuts, O-rings (e.g. ceramic or metal rings), and/or gaskets to prevent any leakage from the feed side 23 to the permeate side 25, and vice versa.

The first ion transport membrane 21 functions to separate oxygen from the second hot air 18 entering the hot air chamber 24 by transporting oxide ions (i.e. $O^{2-}$) through a membrane that is capable of conducting oxide ions and electrons at elevated temperatures. When an oxygen partial pressure differential is applied on opposite sides of such a membrane, oxygen molecules ionize on one surface of the membrane and emerge on an opposite side as oxide ions. Then, the oxide ions (i.e. $O^{2-}$) recombine into molecular oxygen (i.e. $O_2$) on the opposite side (i.e. the permeate side 25), leaving behind free electrons that transport back through the membrane to ionize another oxygen molecule present on the feed side 23. Accordingly, the first ion transport membrane 21 may allow passage of oxide ions (i.e. $O^{2-}$), and thus $O_2$, from the feed side to the permeate side.

The first ion transport membrane 21 may have a composition with a general formula $A_xA'_{x'}B_yB'_{y'}O_{3-z}$, wherein each of A and A' is selected from the group consisting of Sr, Ba, La, and Ca, and each of B and B' is selected from the group consisting of Fe, Co, Cr, Ti, Nb, Mn, and Ga. Further, each of x, x', y, and y' in the general formula presented has a value between 0 and 1, such that x+x'=1 and y+y'=1. Also, z is a number that varies to maintain electro-neutrality of the ion transport membrane. For example, in some embodiments, the ITM is a perovskite-type ceramic having a composition of $Ba_uBi_wCo_xFe_yO_{3-\delta}$, $Ba_uCo_wFe_xNb_yO_{3-\delta}$, $Ba_uFe_xNb_yO_{3-\delta}$, $Ba_wCe_xFe_yO_{3-\delta}$, $Ba_uSr_wCo_xFe_yO_{3-\delta}$, $Ba_uTi_wCo_xFe_yO_{3-\delta}$, $Ca_uLa_wFe_xCo_yO_{3-\delta}$, $Sr_uCa_wMn_xFe_yO_{3-\delta}$, $Sr_uCo_wFe_yO_{3-\delta}$, $La_2NiO_{4+\delta}$, $La_wCa_xFe_yO_{3-\delta}$, $La_wCa_xCo_yO_{3-\delta}$, $La_uCa_wFe_xCo_yO_{3-\delta}$, $La_wSr_xCo_yO_{3-\delta}$, $La_uSr_wTi_xFe_yO_{3-\delta}$, $La_uSr_wCo_xFe_yO_{3-\delta}$, $La_uSr_wGa_xFe_yO_{3-\delta}$, or $12.8La_vSr_{w-}Ga_xFe_yO_{3-\delta}$—$Ba_uSr_vFe_wCo_xFe_yO_{3-\delta}$, wherein u, v, w, x, and y are each in the range of 0-1, and δ varies to maintain electro-neutrality.

The ion transport membrane can preferably comprise mixed metal oxide materials and be used as a catalytic membrane for gas-phase oxygen separation processes. Oxygen-deficient oxides are derived from brownmillerite materials which have the general structure $A_2B_2O_5$. The metal elements at the B-site in the brownmillerite structure are selected to provide mixed ion- and electron-conducting materials and particularly to provide material that conduct oxygen anions and electrons. The materials of this invention have the general formula: $A_xA_{x'}A_{2-(x+x')}B_yB_{y'}B_{2-(y+y')}C'_{5+z}$ where: x and x' are greater than 0; y and y' are greater than 0; x+x' is less than or equal to 2; y+y' is less than or equal to 2; z is a number that makes the metal oxide charge neutral; A is an element selected from the lanthanide elements and yttrium; A' is an element selected from the Group 2 elements; B is an element selected from the group consisting of Al, Ga, In or mixtures thereof; and B' and B" are different elements and are independently selected from the group of elements Mg or the d-block transition elements. The lanthanide metals include the f block lanthanide metals: La, Ce, Pr, Nd, Pm, Sm, Eu, Gd, Tb, Dy, Ho, Er, Tm, Yb, and Lu. Yttrium has properties similar to the f block lanthanide metals and is also included in the definition of lanthanide metals. A is preferably La or Gd, with La more preferred. Group 2 metal elements of the Periodic Table (also designated Group 11a) are Be, Mg, Ca, Sr, Ba, and Ra. The preferred Group 2 elements for the A' element of the materials of this disclosure are Ca, Sr, and Ba, where Sr is most preferred. The more preferred B elements are Ga and Al, with Ga more preferred. The d block transition elements include Sc, Ti, V, Cr, Mn, Fe, Co, Ni, Cu, and Zn. Preferred B' and B" elements are Mg, Fe, and Co, with Fe and Co being more preferred as B' and B", respectively. Mixed metal oxides in which B" and B" are Fe and Co are particularly preferred for membranes having high oxygen flux rates. The value of z in the above formula depends upon the values of x, x', y and y' and the oxidation states of the A, A', A", B, B', and B" elements. The value of z is such that the mixed metal oxide material is charge neutral. In preferred materials, the value of z is between zero and one, 0<z<1. Preferred stoichiometries for materials of this invention of the above formula are those in which x is about 0.1 to about 0.6, and x' is about 1.4 to about 1.9, and where in addition x+x' is about equal to 2. More preferred are materials in which x is about 0.3 to about 0.5 and x' is about 1.5 to about 1.7. Also preferred are those materials of the above formula where y is about 0.3 to about 0.9 and y' is about 0.70 to about 1.70. More preferred materials have y equal to about 0.6 and y' equal to about 1.0 to about 1.4. More preferred materials have y+y' equal to about 1.6 to about 2.0.

Electronically- and ionically-conducting membranes employed as ion transport membranes comprise mixed metal oxides of the above formula. Substantially gas-impermeable membranes having both electronic and ionic conductivity are formed by initially preparing mixed metal oxide powders by repeatedly calcining and milling the powders of individual metal oxides or the corresponding carbonates (or other metal precursors) in the desired stoichiometric ratios. The resulting mixed metal oxide is then pressed and sintered into dense membranes of various shapes, including disks and open-one-ended tubes. These membranes are then employed to construct catalytic membrane reactors, particularly for oxygen separation processes. The purity of the product oxygen produced in reactors, which can be stored or used in other chemical processes, is generally greater than about 90% and preferably greater than about 99%. The presence of the mixed metal oxide of desired stoichiometry (as in the given formulas) in a repeatedly calcined and milled mixed metal oxide can be assessed by X-ray diffraction studies.

The oxidation surface, the reduction surface, or both surfaces (or parts of those surfaces) of the membrane can be coated with an oxidation catalyst or reduction catalyst, respectively, or both. A preferred catalyst for either or both surfaces of the membrane is $La_{0.8}Sr_{0.2}CoO_{3-z}$ where z is a number that makes the oxide charge neutral.

In another embodiment, the ion transport membrane is a perovskite-type ceramic having a composition of $La_{1-x}Sr_xCoO_{3-\delta}$ with x in the range of 0.1-0.7. The ion transport membrane may be doped with a metallic element selected from the group consisting of Ni, Co, Ti, Zr, and La, or a metallic element selected from the lanthanide group of the periodic table (i.e. metallic chemical elements with atomic numbers 57 through 71). Furthermore, the ion transport membrane may include a coating layer having a composition of $RBaCO_2O_{5|\delta}$, wherein R is a metallic element selected from the lanthanide group (i.e. elements with atomic numbers 57 through 71) of the periodic table. Preferably, R is at least one element selected from the group consisting of Pr, Nd, Sm, and Gd. In a preferred embodiment, the ion transport membrane includes pores in the size range of 0.1-10 nm, preferably 0.5-5 nm, more preferably 0.5-3 nm.

In a preferred embodiment, the first ion transport membrane 21 is a BSCF membrane material (i.e. $Ba_{0.5}Sr_{0.5}CO_{0.8}Fe_{0.2}O_{3-\delta}$ membrane) as provided by Mezghani et al. See Mezghani, K., et al., "Effect of microstructure and thickness on oxygen permeation of $La_2NiO_{4+\delta}$ membranes," *Ceramics International,* 2016, 42(1).

In one embodiment, a selectivity of the first ion transport membrane 21 with respect to oxide ions (i.e. $O^{2-}$) is at least 90%, preferably at least 95 wt %, more preferably at least 98 wt %. Selectivity of an ITM with respect to an ion (e.g. oxide ions) is a measure of the capability of that ITM to transport the ion (e.g. oxide ions), relative to the total ionized substances (by weight) on a surface of the ITM. Selectivity of an ITM with respect to oxide ions may be determined by the size of vacancies present in the crystal structure of the ITM. For example, if selectivity of an ITM with respect to oxide ions is 99 wt %, then 99 wt % of transported substances through the membrane are oxide ions, relative to the total ionized substances (by weight) on the surface of the ITM. Oxide ions form in a reduction reaction when molecular oxygen 26 is contacted with the feed side 23 of the first ion transport membrane 21 and in the presence of free electrons. An ITM having 100 wt % selectivity with respect to oxide ions only allows the oxide ions to permeate through the membrane. In one embodiment, a selectivity of the first ion transport membrane 21 with respect to carbon dioxide, elemental nitrogen (i.e. $N_2$), water vapor, carbon monoxide, argon, and sulfur is less than 5 wt %, preferably less than 2 wt %, more preferably less than 1 wt %, even more preferably less than 0.5 wt %, relative to the total ionized substances (by weight) on the surface of the first ion transport membrane 21.

As mentioned earlier, the hydrogen combustion system 39 produces a second steam 40, which powers a first gas turbine 42. The gas turbine as used herein may preferably be a centrifugal or an axial flow turbine, wherein the second steam 40 is expanded in an isentropic process (i.e. a constant entropy process) to produce shaft work when the second steam 40 passes through vanes of said turbine. The shaft work may further be utilized to drive a compressor, a generator (for generating electricity), a crankshaft of an engine, a flywheel for energy storage, etc. In a preferred embodiment, at least a portion of the shaft work is utilized to operate the first electric generator 43, and in a further embodiment, a portion of the shaft work is used to operate an air intake compressor 52 for compressing atmospheric air 50 and driving an intake air 64 to the solar heated air system 13. However, in some embodiments, one or more compressors may be present to provide a flow of unheated or solar-heated air, and these one or more compressors may not be driven by shaft work from a turbine, but from an electric motor.

The system 5 also includes a carbon monoxide combustion system 44 fed CO 36 from the fuel reformer 32 and fed $O_2$ 28 separated from the second hot air 18 by a second ion transport membrane 22. The CO line fed to the CO combustion system 44 contains at least 50 vol %, or at least 60 vol %, or at least 70 vol %, or at least 80 vol %, or at least 90 vol % of carbon monoxide, and less than 50 vol %, or less than 40 vol %, or less than 30 vol %, less than 20 vol %, or less than 10 vol % of hydrogen. The CO stream may be at a temperature in the range of 500-1,000° C., preferably 600-900° C., and a pressure in the range of 1 to 5 bars, preferably 2 to 4 bars. The carbon monoxide combustion system 44 may also be called a CO oxy transport reactor (OTR). The carbon monoxide combustion system 44 produces $CO_2$ 46 that powers a second gas turbine 48 that is connected to a second electric generator 45. The second gas turbine 48 may have one or more characteristics similar to the first gas turbine 42. The $CO_2$ 46 may encounter a first $CO_2$ splitter 49 that directs a first portion of $CO_2$ 58 to the hydrogen combustion chamber 39 as a sweep gas. The other $CO_2$ may be diverted to a second splitter 61 that produces a second portion of $CO_2$ 60 which is directed to the fuel atomizer 15 where the fuel 79 is atomized by the second portion of $CO_2$ 60 prior to entering the fuel reformer 32. The second splitter 61 may also produce a stream of $CO_2$ for sequestering 62. In one embodiment, the second splitter 61 may direct $CO_2$ to a storage tank. In another embodiment, all generated $CO_2$ is self-contained in the system. In a further embodiment, the system 5 does not sequester $CO_2$ and does not release $CO_2$ into the atmosphere. In one embodiment, the $CO_2$ is self-contained in the system except for excess $CO_2$ that is sequestered. In one embodiment, $CO_2$ is compressed before being sequestered.

In one embodiment, the CO combustion system 44 produces at least 99 vol %, preferably at least 99.5 vol %, preferably at least 99.9 vol % of carbon dioxide and water vapor, and may also include less than 1.0 vol %, preferably less than 0.5 vol % of carbon monoxide, nitrogen oxides (i.e. nitric oxide, nitrous oxide, nitrogen dioxide), sulfur dioxide, argon, helium, and/or carbonic acid. In one embodiment, the exhaust stream has a temperature in the range of 500-2,000° C., preferably 800-1,500° C., more preferably 900-1,200° C., and a pressure in the range of 5-50 bars, preferably 10-40 bars, more preferably 15-30 bars.

In one embodiment, one or more additional compressors may be present to compress flows of $CO_2$. For instance, the second portion of $CO_2$ 60 may be compressed by a compressor 78 prior to atomizing the fuel 79. Also, the first portion of $CO_2$ 58 may be compressed by a compressor 76 prior to entering the hydrogen combustion chamber as a sweep gas. In one embodiment, either or both compressors 76/78 may receive at least a portion of shaft work from a third gas turbine 54 by being mechanically coupled and powered by the third gas turbine.

In one embodiment, the first portion of $CO_2$ 58 that enters the hydrogen combustion chamber 39 as a sweep gas may later be recovered and separated from the second steam 40, by passing through a heat exchanger or steam condenser 86. As shown in FIGS. 1 and 2, the heat exchanger or steam condenser 86 may be cooled by an intake of atmospheric air 50 that is later routed to the solar collector 10 for subsequent heating and use as solar-heated hot air 14/72. The heat exchanger or steam condenser 86 produces a second water 85, that enters a pump 84, and is later heated to produce the first steam source 47. The second water 85 may be heated by a heat exchanger 82 or heated by other means, such as by fuel combustion, a solar collector, or a boiler.

The second ion transport membrane 22 allows $O_2$ 28 to permeate from a feed side 27 to a permeate side 29. The second ion transport membrane 22 may have any one or more similar characteristics as discussed previously for the first ion transport membrane 21, including, but not limited to, geometry, vessel size, surface area, oxygen flux, compressive strength, composition, and selectivity. In an alternative embodiment, the system 5 may only comprise a single ion transport membrane, which separates $O_2$ from hot air, and then diverts the $O_2$ into two streams: one stream destined for the hydrogen combustion system 39, and the other stream destined for the CO combustion system 44.

In one embodiment, a flow of permeating gas through the first and/or second ITM 21/22 contains at least 20 vol %, preferably at least 30 vol %, preferably at least 40 vol %, preferably at least 60 vol %, preferably at least 80 vol %, preferably at least 90 vol %, preferably at least 95 vol %, preferably at least 98 vol %, preferably at least 99 vol % of oxygen; and no more than 80 vol %, preferably no more than 60 vol %, preferably no more than 40 vol %, preferably no more than 20 vol %, preferably no more than 10 vol %, preferably no more than 5 vol %, preferably no more than 2 vol % of nitrogen. In addition, the oxygen-containing stream may contain less than 1.0 vol %, preferably less than 0.5 vol % of hydrogen, argon, carbon dioxide, neon, helium, and water vapor.

In one embodiment, as the passage of the second hot air 18 against the feed sides 23/27 of the first and second ion transport membranes allow $O_2$ to pass to the permeate sides 25/29, the rejected gas on the feed sides is $O_2$-depleted air 30, or equivalently, $N_2$-enriched air. In one embodiment, this $O_2$-depleted air may result separately from hot air contacting two separate ITMs, however, the systems 5 of FIGS. 1 and 2 both show that the feed sides 23/27 of the first and second ion transport membranes surround the same volume of the second hot air 18, and thus produce a combined $O_2$-depleted air downstream of the second hot air 18.

Upon exiting the hot air chamber 24, the $O_2$-depleted air 30 comprises at least 20 vol %, or at least 40 vol %, or at least 60 vol %, or at least 80 vol %, or at least 90 vol %, or at least 95 vol %, or at least 98 vol %, or at least 99 vol % of nitrogen; and no more than 80 vol %, preferably no more than 60 vol %, preferably no more than 40 vol %, preferably no more than 20 vol %, preferably no more than 10 vol %, preferably no more than 5 vol %, preferably no more than 2 vol % of oxygen. The $O_2$-depleted air 30 may further include less than 1 vol % of argon, carbon dioxide, neon, helium, hydrogen, and water vapor. Alternatively, a portion of the $O_2$-depleted air 30, which is rich in nitrogen, may be utilized in fertilizer industries. The $O_2$-depleted air 30 may have an oxygen partial pressure within the range of 10 to 400 torr, preferably 50 to 300 torr. In the embodiments where an oxygen partial pressure of the $O_2$-depleted air 30 is above 100 torr, preferably above 200 torr, a portion of the $O_2$-depleted air 30 may be recycled to be mixed with the second hot air 18 stream to be delivered to the first and/or second ITM 21/22.

In one embodiment, the system 5 comprises a third gas turbine 54 which is powered by the expansion of the $O_2$-depleted gas. This third gas turbine 54 may be mechanically connected to and power a compressor, such as the compressor 76 previously mentioned for compressing a first portion of $CO_2$ for use as a sweep gas. The third gas turbine 54 may be mechanically connected to and power a third electric generator 56.

In another embodiment, the $O_2$-depleted air, after expanding in a gas turbine or without expanding in a gas turbine, may be directed to a heat exchanger 82 for heating a first steam source 47 to make up a portion or all of the first steam 19 destined for the fuel reformer 32. In a further embodiment, the water used to form the first steam source 47 is a second water 85 condensed in a condenser 86 from the second steam 40. The $O_2$-depleted air may be released to the atmosphere or rerouted to a different part of the system.

In one embodiment, the system 5 further includes a water treatment apparatus located downstream of and fluidly connected to the condenser 86 via a purified water line, where the water treatment apparatus produces distilled water. The water treatment apparatus as used herein refers to a series of operational units, e.g. chlorination units, sedimentation units, UV radiation units, filtration units, reverse osmosis units, etc. that produces distilled water for industrial applications and/or drinking water for domestic use. A distilled water stream may be delivered to a water reservoir or tank via a distilled water line.

In one embodiment, the system 5 further comprises a second steam source 66 for the fuel reformer, which may combine with the first steam source 47 before entering the fuel reformer. In one embodiment, the second steam source 66 is produced by heating a first water 68 by a third hot air 72 produced by the solar heated air system 13. The system may have a pump 70 for carrying the first water 68 to a heat exchanger 74 for heating by the third hot air 72. In one embodiment, this heat exchanger 74 may be considered a boiler. In another embodiment, rather than heating the first water 68 with the third hot air 72, the first water 68 may be heated directly by solar energy, for instance, in a similar solar tower or solar collector. In another embodiment, the first water 68 may be heated by some other heat source within the system 5, for instance, excess heat produced by the hydrogen gas combustion chamber 39. In one embodiment, the second steam source 66 may be used to start the steam reforming process, and once the system 5 is running, the first steam source 47 may be sufficient to provide a majority or all of the first steam 19 to the fuel reformer 32.

The system 5 as a whole may accommodate a wide variety of flow rates and vessel volumes. The vessels of the system 5 include but are not limited to the vessel for the first hot air 20, the fuel reformer 32, the hydrogen combustion system 39, the hot air chamber 24 bounded by ITMs, the CO combustion system 44, the fuel atomizer heater 15.

Additionally, some membranes may be fit within separate vessels, or may be fit within any of the above vessels. These membranes include the hydrogen separation membrane 38, the first and second ITMs 21/22, and any additional membranes that may be used, for instance, a filtration membrane used to remove particulate matter from the atmospheric air intake 50 or from the first water intake 68. Additional vessels may include any compressor, turbine, splitter, heat exchanger, solar collector, pump, and storage tank.

An internal volume of any vessel may be in the range of 0.01-50 $m^3$, or preferably 0.1-20 $m^3$, or preferably 0.5-10 $m^3$, or preferably 1-5 $m^3$. In view of that, an aspect ratio of a vessel (i.e. a ratio of a length to a diameter of the vessel) is in the range of 50:1 to 1:1, preferably 40:1 to 5:1, preferably 30:1 to 10:1. Preferably, the vessel is horizontally oriented, i.e. the longitudinal axis of the first vessel is parallel to a ground surface, although the vessel may also be vertically oriented. The vessel may have other geometries such as rectangular, spherical, oblong, ellipsoidal, conical, prismatic, toroidal, and pyramidal.

In one embodiment, any vessel is configured to hold a gaseous mixture at elevated temperatures and pressures, for example, at a temperature in the range of 800-2,000° C., more preferably 1,000-1,800° C., even more preferably 1,200-1,500° C., and at a pressure in the range of 1-50 bars, preferably 5-30 bars, more preferably 10-20 bars. In a preferred embodiment, any vessel is made of a high-temperature duty ceramic composite that can endure a temperature of up to 1,500° C., preferably up to 2,000° C., more preferably up to 2,500° C. Exemplary high-temperature duty ceramic composite may include, but are not limited to, borides, carbides, nitrides, and oxides of transition metals selected from the group consisting of Al, Si, Sc, Ti, V, Cr, Zr, Nb, Mo, Hf, Ta, and Th, for example, hafnium diboride ($HfB_2$), zirconium diboride ($ZrB_2$), hafnium nitride (HfN), zirconium nitride (ZrN), titanium carbide (TiC), titanium nitride (TiN), thorium dioxide ($ThO_2$), tantalum carbide (TaC), and composites thereof. Any vessel may also be made of a metal alloy such as stainless steel, nickel steel, chromium steel, cemented carbide, titanium, and the like. In the embodiments where a vessel is made of a metal alloy, an interior surface of the vessel may be coated with an oxidation resistant layer to minimize internal surface oxidation. For example, the interior surface of the vessel may be coated with the high-temperature duty ceramic composite, quartz, alumina, silicon nitride, silicon carbide, Pyrex®, and the like. The materials used to construct any vessel are not meant to be limiting and various other materials may also be used.

In one embodiment, any membrane used in the system, such as the hydrogen separation membrane 38, the first and second ITMs 21/22, and any additional membranes may independently have a thickness in a range of 1 µm to 10 cm, preferably 5 µm to 1 cm, more preferably 20 µm to 8 mm. A surface area of any membrane may be in the range of 0.05-5 $m^2$, preferably 0.1-4 $m^2$, more preferably 0.5-3 $m^2$, even more preferably 1-2 $m^2$. A flux through a membrane may be 0.01-0.2 mol·$m^{-2}$·$s^{-1}$, preferably 0.05-0.15 mol·$m^{-2}$·$s^{-1}$, more preferably 0.08-0.12 mol·$m^{-2}$·$s^{-1}$.

In some embodiments, two vessels may be separated by a membrane. Additionally, the fuel reformer 32 may be considered a vessel or a membrane. In one embodiment, hydrogen separation membrane 38 is in direct contact with both the fuel reformer 32 and the hydrogen combustion system 39. In one embodiment, the first ion transport membrane 21 is in direct contact with both the hydrogen combustion system 39 and the hot air separation chamber 24. In one embodiment, the second ion transport membrane 22 is in direct contact with both the hot air separation chamber 24 and the CO combustion system 44. These configurations may enable more effective heat transfer among vessels and membranes, for instance, heat from the hot air separation chamber 24 may be carried across either or both ITMs 21/22. In one embodiment the interface between any membrane and vessel that are in direct contact with each other may be flat or substantially planar, or curved, such as cylindrical or spherical. In one embodiment, one or more vessels or membranes may be cylindrical and coaxially positioned.

In one embodiment, the hydrogen separation membrane 38 is in direct contact with and forms substantially planar interfaces with both the hydrogen combustion system 39 and the fuel reformer 32.

In one embodiment, the first ion transport membrane 21 is in direct contact with and forms substantially planar interfaces with both the hydrogen combustion system 39 and the hot air separation chamber 24.

In one embodiment, the second ion transport membrane 22 is in direct contact with and forms substantially planar interfaces with both the hot air separation chamber 24 and the CO combustion system 44.

In one embodiment, all major vessels and membranes may be in contact with each other as described above, meaning that the hydrogen separation membrane 38 is in direct contact with both the fuel reformer 32 and the hydrogen combustion system 39; the first ion transport membrane 21 is in direct contact with both the hydrogen combustion system 39 and the hot air separation chamber 24; and the second ion transport membrane 22 is in direct contact with both the hot air separation chamber 24 and the CO combustion system 44.

In a further embodiment, the vessels and membranes may be present within a single, compact, coaxially-arranged reactor. Here, the fuel reformer 32 may have a cylindrical shape and may be in direct contact with and surrounded by the hydrogen separation membrane 38. In some embodiments, the fuel reformer may have one or more conduits for heading by the first hot air 20. The hydrogen separation membrane 38 may have a cylindrical shape and may be surrounded by and in direct contact with the hydrogen combustion system 39. The hydrogen combustion system 39 may have a cylindrical shape and may be surrounded by and in direct contact with the first ion transport membrane 21. The first ion transport membrane 21 may have a cylindrical shape and may be surrounded by and in direct contact with the hot air separation chamber 24. The hot air separation chamber 24 may have a cylindrical shape and may be surrounded by and in direct contact with the second ion transport membrane 22.

The second ion transport membrane 22 may have a cylindrical shape and may be surrounded by and in direct contact with the CO combustion system 44. The CO combustion system 44 may then be surrounded by an external housing, insulation, or heating chamber. Such single compact reactor as describe above may have a bulk volume in the range of 0.1-100 m$^3$, or preferably 0.2-40 m$^3$, or preferably 1-30 m$^3$, or preferably 1.1-10 m$^3$. In view of that, an aspect ratio of the reactor may be in the range of 50:1 to 1:1, preferably 40:1 to 5:1, preferably 30:1 to 10:1.

In an alternative embodiment, a single, compact, reactor may begin with the CO combustion system 44 near a center of the reactor and build outwards, with or without a coaxial arrangement.

In one embodiment, certain membranes and vessels need not be in direct contact with one another, for instance, the fuel reformer 32 may be located separately from the hydrogen separation membrane 38, so that the fuel reformer produces a flow of mixed $H_2$ and CO which is delivered to a hydrogen separation membrane for separation. Similarly, any $H_2$, $O_2$, or CO may be stored and used at a later point in time. For instance, at night, the system 5 may run on stored fuels for power generation.

In one embodiment, vessels separated by a membrane may have co-current or counter current flow when comparing the flows within the vessels. For instance, in FIGS. 1 and 2, the hot air separation chamber 24 and the CO combustion system 44 have counter current flows, while the fuel reformer 32 and hydrogen combustion chamber 39 have co-current flows.

In some embodiments, each of the lines that carry a gaseous stream in the system, e.g. the line for hot air 14, the line for the first steam 19, the line for the first $CO_2$ 58, the line for CO 36, the line for $O_2$-depleted air 30, are substantially the same. Accordingly, a diameter of each of said lines may vary depending on the volumetric flow rate of the gaseous stream present in that line, and may range from about 1 cm to about 20 cm, preferably from about 2 cm to about 15 cm, preferably from about 3 cm to about 12 cm, preferably from about 5 cm to about 10 cm. Furthermore, a thickness of each of said lines may also vary depending on the pressure and the temperature of the gaseous stream present in that line. For example, in one embodiment, the temperature of the gaseous stream is in the range of 600 to 1,000° C., preferably 700 to 900° C., wherein the thickness of the line that carries that gaseous stream is within the range of 2 to 50 mm, preferably 5 to 30 mm, more preferably 8 to 20 mm. Also, a material type of each of the aforementioned lines may vary depending on the temperature, pressure, and the type of the carrying gaseous stream. For example, in one embodiment, the temperature of the gaseous stream is in the range of 600 to 1,000° C., preferably 700 to 900° C., and the pressure of the gaseous stream is within the range of 5-50 bars, preferably 10-40 bars, more preferably 20-30 bars. Accordingly, the line that carries a gaseous stream with the above mentioned temperature and pressure may be made of a high-temperature duty metal or a metal alloy with an alumina liner that covers an interior of the line. In general, each of said lines may preferably be made of a high-temperature duty metal or a metal alloy to bear a pressure up to 50 bars, preferably up to 100 bars, even more preferably up to 150 bars, and to endure a temperature up to 1,500° C., preferably 2,000° C., more preferably 2,500° C.

In some other embodiments, each of the lines that carry a liquid stream in the system, e.g. the line for first water 68, the line for the second water 85, the line for liquid fuel 79, are substantially the same. Accordingly, a diameter of each of said lines may vary depending on the volumetric flow rate of the liquid stream present in that line, and may range from about 1 cm to about 20 cm, preferably from about 2 cm to about 15 cm, preferably from about 3 cm to about 12 cm, preferably from about 5 cm to about 10 cm. Furthermore, a thickness of each of said lines may also vary depending on the pressure of the liquid stream present in that line. For example, in one embodiment, the pressure of the liquid stream is in the range of 1 to 10 bars, preferably 2 to 8 bars, wherein the thickness of the line that carries the liquid stream is within the range of 2 to 20 mm, preferably 5 to 15 mm, more preferably 8 to 12 mm. Also, a material type of each of the aforementioned lines may vary depending on the temperature, pressure, and the type of the carrying liquid stream. Preferably, an interior surface of the lines that carries a liquid stream in the system is coated with a polymeric material, e.g. epoxy or vinyl ester, or a ceramic material, e.g. silica or alumina, to prevent oxidation and corrosion.

In one embodiment, the hydrogen combustion system 39 and/or the CO combustion chamber 44 may be fit with a piston, adapted to a fuel cell, or adapted to some other means of capturing energy. Alternatively, $H_2$ produced may not be combusted but may be transferred to a hydroprocessing unit such as a hydrocracker or a hydrotreater (i.e. hydrodesulfurization), or an ammonia manufacturing plant, or a downstream petrochemical processing plant with a hydrogen gas demand.

In one embodiment, the system 5 is a large-scale manufacturing plant, wherein the system may produce about 10 to 100 ton/day, preferably, 20 to 90 ton/day, more preferably 30 to 80 ton/day of hydrogen gas in the fuel reformer 32. In a preferred embodiment, the power generation system has a hydrogen extraction factor in the range of 0.3 to 0.95, preferably 0.5 to 0.92, preferably 0.8 to 0.91, preferably about 0.9. The term "hydrogen extraction factor" as used herein refers to a ratio of the amount of hydrogen that is produced to the hydrogen that is theoretically intended to be produced by the power generation system. In view of the hydrogen extraction factor, an annualized cost of hydrogen is in the range of 20 to 80 $/GJ, preferably 25 to 70 $/GJ, preferably 30 to 60 $/GJ.

In another embodiment, the system 5 may have an auxiliary fuel factor, which is in the range of 0.4 to 1.5, preferably 0.5 to 1.3, preferably 0.6 to 1.2, preferably 0.7 to 1.0, preferably about 0.8. The term "auxiliary fuel factor" as used herein refers to a ratio of the amount of the natural gas stream reformed to the amount of the natural gas that is optionally supplied directly to a fuel combustor. In view of the auxiliary fuel factor, an annualized cost of hydrogen may be in the range of 20 to 80 $/GJ, preferably 25 to 50 $/GJ, preferably 30 to 40 $/GJ.

Considering a specific energy of hydrogen, which is in the range of 120 to 140 MJ/kg (mega joules per kilogram) of hydrogen gas at various hydrogen pressure, the system 5 may generate an electric power in the range of 1 to 10 MW (megawatt), preferably 2 to 9 MW, preferably 3 to 8 MW, preferably 4 to 6 MW, preferably about 4.8 MW just from the hydrogen produced and combusted within the system 5 (and powering the first electric generator 43). Considering the total power generated, such as from the first, second, and third electric generators combined (43/45/56), the system 5 may generate an electric power in the range of 5 to 15 MW (megawatt), preferably 6 to 12 MW, preferably 7 to 10 MW, preferably about 8 MW.

In addition, the amount of $CO_2$ that may be captured, or else diverted from release into the atmosphere, may be in the range of 300 to 600 ton/day, preferably 350 to 550 ton/day, preferably 400 to 500 ton/day, preferably about 450 ton/day, which is equivalent to about 80 to 150 kg of $CO_2$ per one gigajoules of hydrogen gas produced (kg $CO_2$/GJ $H_2$), or preferably about 100 to 120 kg $CO_2$/GJ $H_2$. In one embodiment, the system 5 has a total $CO_2$ emission in the range of 120 to 180 kg $CO_2$/GJ $H_2$, preferably 140 to 165 kg $CO_2$/GJ $H_2$. Accordingly, an overall efficiency of the system may vary in the range of 0.3 to 0.6, preferably 0.32 to 0.5, more preferably 0.33 to 0.45.

An overall efficiency of the system may vary in the range of 0.3 to 0.6, preferably 0.32 to 0.5, more preferably 0.33 to 0.45. In a preferred embodiment, the temperature of the exhaust stream that exits the combustor is in the range of 500-2,000° C., preferably 800-1,500° C., more preferably 900-1,200° C., and the system has an overall efficiency of 0.3 to 0.6, preferably 0.32 to 0.5, more preferably 0.33 to 0.45. Accordingly, an annualized cost of hydrogen may be in the range of 10 to 40 $/GJ, preferably 15 to 35 $/GJ, preferably 20 to 33 $/GJ.

According to a second aspect, the present disclosure relates to a method for generating electricity using the system 5 of the first aspect, and as discussed previously. This method involves exposing the solar-heated air system 13 to sunlight to produce the first and second hot air 20/18, where the first hot air 20 heats the fuel reformer 32. A vaporized fuel 17 and the first steam 19 are fed into the fuel reformer 32, producing separate streams of CO 36 and $H_2$ 34 by the hydrogen separation membrane 38. The second hot air 18 is fed to the first and second ion transport membranes 21/22 to produce a first and a second stream of $O_2$ 26/28. The $H_2$ stream 34 is combusted with the first stream of $O_2$ 26 to generate electricity in the first electric generator 43. The CO stream 36 is combusted with the second stream of $O_2$ 28 to generate electricity in the second electric generator 45.

In one embodiment, the method further comprises producing a stream of $O_2$-depleted air 30 from the second hot air 18, and feeding the stream of $O_2$-depleted air 30 to generate electricity in a third electric generator 56.

In one embodiment, the method further comprises feeding a $CO_2$ into the hydrogen combustion system 39. The $CO_2$ 58 is produced by combusting the CO stream 36.

The examples below are intended to further illustrate the system and uses thereof, and are not intended to limit the scope of the claims.

Example 1

System Economic Analysis

In this section, the economic viability of hydrogen production in the proposed Solar-Assisted Liquid Fuel Reformer-ITM Oxy Combustion Membrane is discussed. The economic evaluation is based on annualized cost concept. This concept has been used to evaluate oxygen production and power production. See Ebrahimi, A., et al., "Energetic, exergetic and economic assessment of oxygen production from two columns cryogenic air separation unit." *Energy*, 2015. 90: p. 1298-1316, and Andersson, K. and F. Johnsson, "Process evaluation of an 865 MW e lignite fired $O_2/CO_2$ power plant." *Energy Conversion and Management*, 2006. 47 (18): p. 3487-3498. Our preliminary studies have shown that an optimal price of $H_2$ of $12/GJ can be obtained when natural gas is reformed to produce hydrogen. See Yinka S. Sanusi and Esmail M. A. Mokheimer, "Thermo-economic optimization of hydrogen production in a membrane-SMR integrated to ITM-oxy-combustion plant using genetic algorithm," *Applied Energy*, 2019. 235: p: 164.

The cost of hydrogen from the system presented in this work was compared with the cost of hydrogen from other technologies and feed stocks (Natural gas, coal, ethanol and biomass). See Patil C, et al. "Experimental study of a membrane assisted fluidized bed reactor for $H_2$ production by steam reforming of $CH_4$." *Chemical Engineering Research and Design*. 2006; 84:399-404; Guide MUs. The Mathworks. Inc, Natick, Mass. 1998; 5:333; Kim C-H, et al. "Hydrogen production by steam methane reforming in membrane reactor equipped with Pd membrane deposited on NiO/YSZ/NiO multilayer-treated porous stainless steel." *Journal of Membrane Science,* 2018; Murmura M, et al. "Transport-permeation regimes in an annular membrane separator for hydrogen purification." *Journal of Membrane Science.* 2016; 503:199-211; Rahimpour M and Pourazadi E. "A comparison of hydrogen and methanol production in a thermally coupled membrane reactor for co-current and counter-current flows," *International Journal of Energy Research.* 2011; 35:863-82; Karimi M, et al. "Improving thermal efficiency and increasing production rate in the double moving beds thermally coupled reactors by using differential evolution (DE) technique," *Applied Thermal Engineering.* 2016; 94:543-58.

Figure 3A:
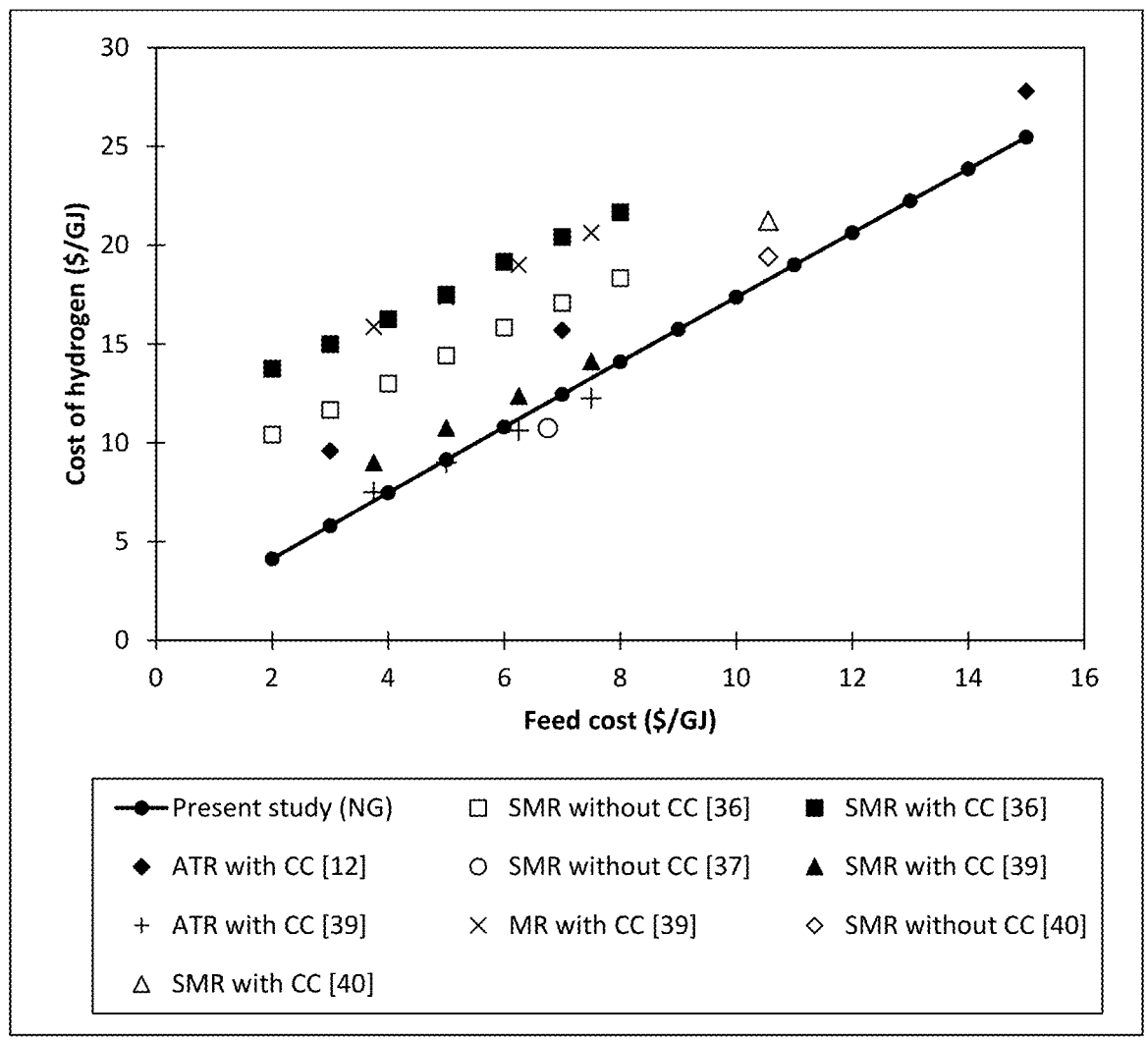
FIG. 3A compares the hydrogen production cost of the invention with hydrogen produced from natural gas.
Figure 3B:
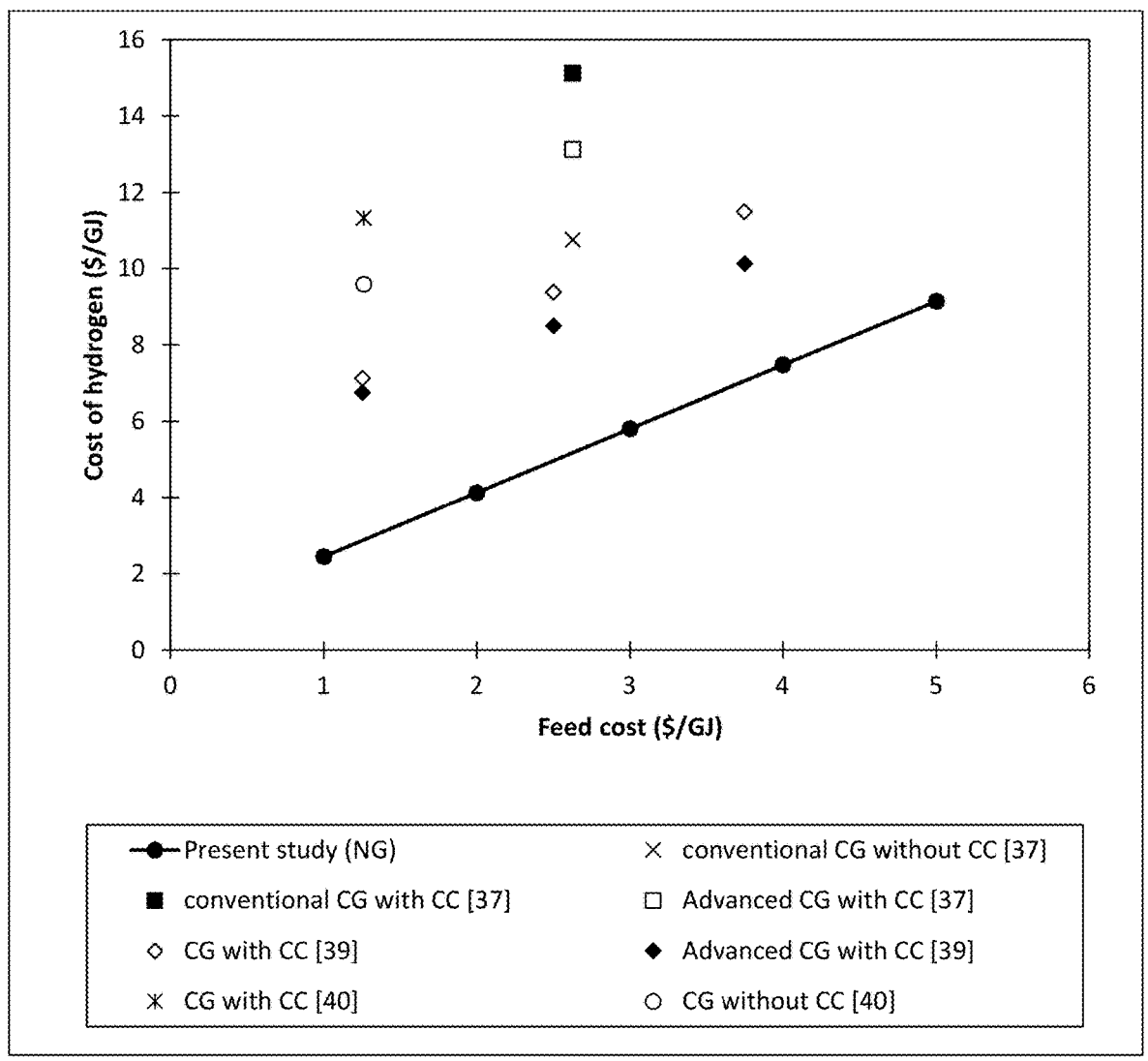
FIG. 3B compares the hydrogen production cost of the invention with hydrogen produced from coal.
Figure 3C:
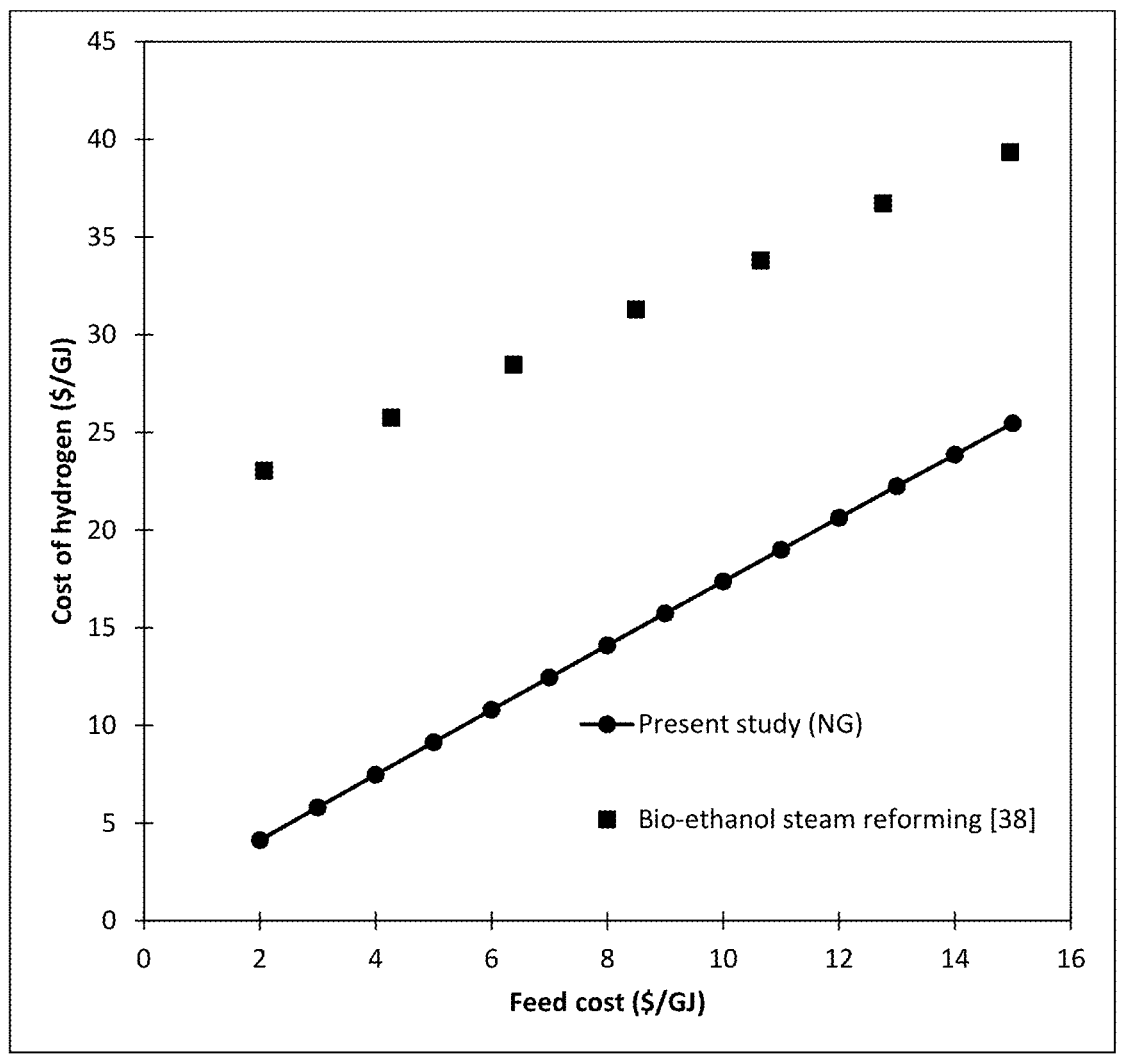
FIG. 3C compares the hydrogen production cost of the invention with hydrogen produced from ethanol.
Figure 3D:
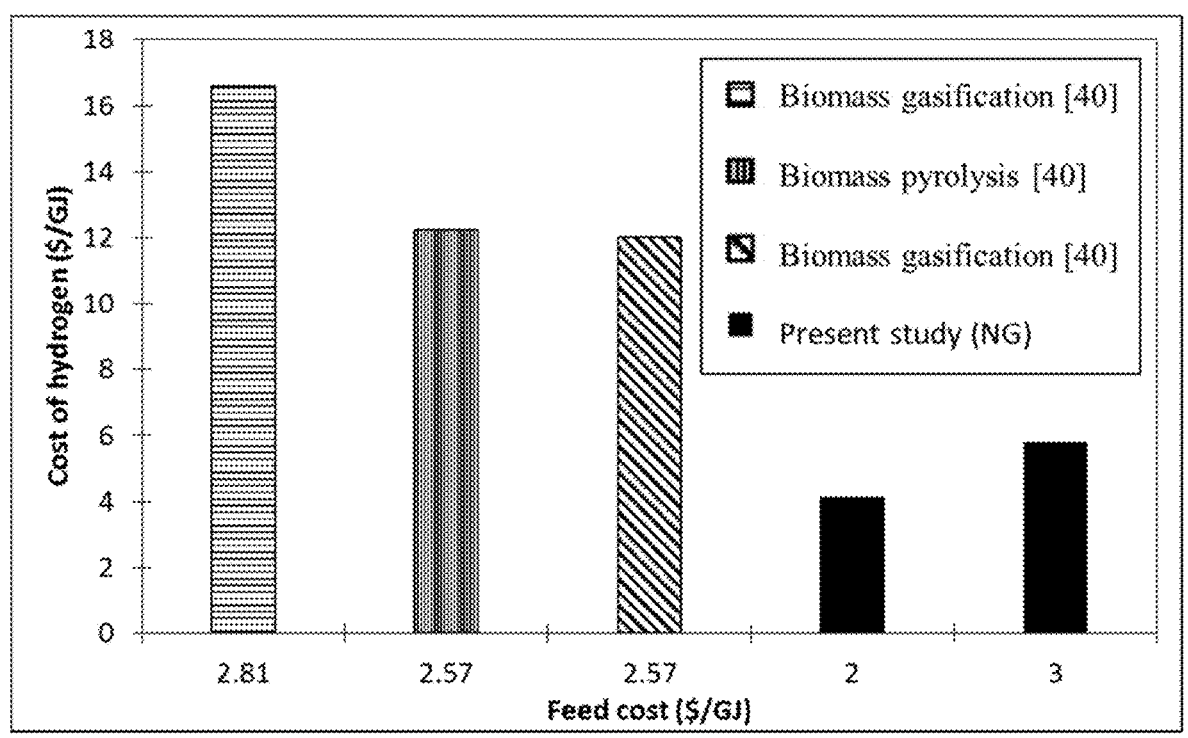
FIG. 3D compares the hydrogen production cost of the invention with hydrogen produced from biomass.

It was found that the cost of hydrogen from the system presented here is mostly lower than various plant designs currently in literature, even without carbon capture (CC) as shown in FIG. 3A. However, in the case of the auto-thermal reformer with carbon capture, the reported cost of hydrogen production is marginally lower than those reported in this work with natural gas exceeding $6/GJ. For comparable ranges of prices of various feed stocks of coal, ethanol, and biomass, the cost of hydrogen production is significantly higher than those of the novel integrated system presented in this article (see FIGS. 3B-3D). This shows that hydrogen production from the integrated system is promising.

The invention claimed is:

1. A system for generation of electricity, comprising:
   a solar-heated air system producing:
      a first hot air for heating of a fuel reformer, and
      a second hot air for separation of $O_2$,
      wherein the fuel reformer reacts a fuel and a first steam to produce $H_2$ and CO;
   a hydrogen combustion system fed $H_2$ separated from the fuel reformer by a hydrogen separation membrane and fed $O_2$ separated from the second hot air by a first ion transport membrane, wherein the hydrogen combustion system produces a second steam and powers a first gas turbine, wherein the second steam is used as a first steam source for the fuel reformer; and
   a carbon monoxide combustion system fed CO from the fuel reformer and fed $O_2$ separated from the hot air by a second ion transport membrane, wherein the carbon monoxide combustion system produces $CO_2$ that powers a second gas turbine,
   wherein the first gas turbine and the second gas turbine are connected to a first and second electric generator, respectively.

2. The system of claim 1, wherein the hydrogen separation membrane comprises vanadium, palladium, or both.

3. The system of claim 1, wherein the fuel is fed into the system as a liquid fuel.

4. The system of claim 1, further comprising an air intake compressor producing an air flow for the solar-heated air system.

5. The system of claim 4, wherein the air intake compressor is mechanically connected to and powered by the first gas turbine.

6. The system of claim 1, wherein a first portion of $CO_2$ produced by the carbon monoxide combustion system is fed as a sweep gas in the hydrogen combustion system.

7. The system of claim 1, wherein a second portion of $CO_2$ produced by the carbon monoxide combustion system is fed to a fuel atomizer where the fuel is atomized by the second $CO_2$ prior to entering the fuel reformer.

8. The system of claim 7, wherein the second portion of $CO_2$ is compressed before entering the fuel atomizer.

9. The system of claim 1, further comprising a second steam source for the fuel reformer, the second steam source produced by heating a first water by a third hot air.

10. The system of claim 1, wherein the hydrogen separation membrane is in direct contact with the fuel reformer and the hydrogen combustion system.

11. The system of claim 1, wherein the first ion transport membrane is in direct contact with the hydrogen combustion system and a hot air separation chamber.

12. The system of claim 1, wherein the second ion transport membrane is in direct contact with the hot air separation chamber and the CO combustion system.

13. The system of claim 1, further comprising a third gas turbine powered by an $O_2$-depleted air,
   wherein the $O_2$-depleted air is produced by the separation of $O_2$ from the second hot air contacting the first and/or second ion transport membranes, and
   wherein the third gas turbine is connected to a third electric generator.

14. The system of claim 13, wherein the $O_2$-depleted air is used to heat a second water to form the first steam source, wherein the second water is condensed from the second steam.

15. The system of claim 13, further comprising a compressor mechanically coupled and powered by the third gas turbine, wherein the compressor compresses a $CO_2$ produced by the carbon monoxide combustion system to produce a first portion of $CO_2$ that is fed as a sweep gas in the hydrogen combustion system.

16. The system of claim 1, wherein all generated $CO_2$ is self-contained in the system.

17. The system of claim 1, wherein the atomized fuel and the fuel reformer are heated simultaneously by a same volume of first hot air.

18. A method for generating electricity using the system of claim 1, comprising:
   exposing the solar-heated air system to sunlight to produce the first and second hot air, wherein the first hot air heats the fuel reformer;
   feeding a vaporized fuel and the first steam into the fuel reformer, producing separate streams of CO and $H_2$ by the hydrogen separation membrane;
   feeding the second hot air to the first and second ion transport membranes to produce a first and a second stream of $O_2$;
   combusting the $H_2$ stream with the first stream of $O_2$ to generate electricity in the first electric generator; and
   combusting the CO stream with the second stream of $O_2$ to generate electricity in the second electric generator.

19. The method of claim 18, further comprising:
   producing a stream of $O_2$-depleted air from the second hot air, and
   feeding the stream of $O_2$-depleted air to generate electricity in a third electric generator.

20. The method of claim 18, further comprising feeding a $CO_2$ into the hydrogen combustion system, the $CO_2$ produced by combusting the CO stream.

* * * * *